United States Patent

[11] 3,630,290

| [72] | Inventors | Lamar Williams;<br>Kenneth Earl Murphy, both of Cedar Falls;<br>Richard Wayne Hook, Des Moines, all of Iowa |
|---|---|---|
| [21] | Appl. No. | 819,649 |
| [22] | Filed | Apr. 28, 1969 |
| [45] | Patented | Dec. 28, 1971 |
| [73] | Assignee | Deere & Company<br>Moline, Ill. |

[54] HYDRAULIC POWER LIFT SYSTEM FOR TRACTOR AND IMPLEMENT
25 Claims, 6 Drawing Figs.

[52] U.S. Cl.................................................. 172/7,
172/316, 172/400, 172/413, 172/439, 280/43.23,
280/411 A
[51] Int. Cl.....................................................A01b 63/112,
A01b 63/22
[50] Field of Search........................................... 172/7-9,
400, 303, 316, 413; 60/52 HE; 91/411, 412;
280/43, 23, 411 A

[56] References Cited
UNITED STATES PATENTS

| 3,486,761 | 12/1969 | Fay............................. | 280/43.23 |
| 3,503,453 | 3/1970 | Johannsen et al. ........... | 172/417 X |
| 2,112,466 | 3/1938 | Maloon........................ | 60/52 HE |
| 2,637,259 | 5/1953 | Acton........................... | 172/316 |
| 2,925,871 | 2/1960 | Gillette......................... | 172/303 |
| 2,974,733 | 3/1961 | Fletcher........................ | 172/7 |
| 3,246,700 | 4/1966 | Smelcer........................ | 172/7 |
| 3,356,382 | 12/1967 | Fay............................... | 172/316 X |
| 3,411,800 | 11/1968 | Krumholz..................... | 91/411 X |
| 3,487,882 | 1/1970 | Burton ......................... | 172/413 X |

*Primary Examiner*—Robert E. Pulfrey
*Assistant Examiner*—Clifford D. Crowder
*Attorneys*—H. Vincent Harsha, Harold M. Knoth, William A. Murray and John M. Nolan

ABSTRACT: An integrally mounted agricultural implement is provided with a pair of outrigger frames pivotally connected to a center frame for independent vertical movement. The outrigger frames are raised and lowered by vertically adjustable wheels operated by hydraulic cylinders. The hydraulic cylinders on the outrigger frames are connected in series with each other and in series with the tractor rockshaft cylinder. The lift system increases the lift capacity of the tractor, permits the use of wider integral implements, permits wide integral implements to follow the ground contour, and retains full draft control of the entire implement.

HYDRAULIC POWER LIFT SYSTEM FOR TRACTOR AND IMPLEMENT

BACKGROUND OF THE INVENTION

The present invention relates generally to tractor implement arrangements, and more particularly relates to improvements in hydraulic lift systems for implements which are integrally mounted to a tractor.

It is well known to connect an integral implement to a tractor in such a manner that variations in the draft load imposed upon the implement are signalled to appropriate means on the tractor, such as a fluid control valve, for supplying and exhausting a tractor-mounted hydraulic motor which will in turn change the vertical adjustment of the implement to accommodate the changes in draft load. However, the size of implements used in such systems has been limited by the implement weight since the tractor is capable of pulling heavier implements than it can lift. If the implement is too heavy, the weight of the implement on the rear of the tractor lightens the front of the tractor which may result in a complete loss of steering control.

It is also known that the size and weight of an implement which can be integrally mounted to a tractor of a given size can be increased by providing hydraulically actuated lift assist wheel at the rear of the implement so that the weight of the implement is shared by the tractor and the lift assist wheel. Such implements are commonly referred to as semi-integral implements. However, the semi-integral implements are still limited in size and are also limited in their use. In order for a tractor operator to raise and lower a semi-integral implement, it is required to simultaneously operate two hydraulic valves, one for the tractor hitch and one for the lift assist wheel. Also, a draft control system cannot be utilized effectively with semi-integral implements since it raises or lowers only the forward portion of the implement and changes the fore-and-aft attitude of the implement. Furthermore, the width of the semi-integral implement is still limited since it cannot follow the ground contour if its width exceeds 16 to 20 feet.

The present invention is intended to provide a hydraulic power lift system for tractor and integral implement arrangements which overcomes all of the problems and limiting factors set forth above, and which makes the tractor horsepower, not tractor lift capacity and implement width, the controlling design factor.

SUMMARY OF THE INVENTION

According to the present invention, full and semi-integral implements are provided with draft responsive gauge or lift assist wheels which aid the tractor hitch in raising or lowering the implement. Draft control of the lift assist wheels is accomplished by connecting the cylinders controlling the lift assist wheels in series with each other and by connecting them in series with the tractor rockshaft cylinder. The series connection also provides the tractor operator with a single lever control for both the tractor hitch and lift assist wheels.

By matching the rod end volume of each cylinder in the series with the anchor end volume of the next cylinder in the series the tractor hitch and the lift assist wheels are vertically adjusted simultaneously and in equal amounts. By providing the lift assist wheel cylinders with bypass orifices and the rockshaft cylinder with a pressure relief valve and/or a bypass orifice, automatic synchronization of the cylinders is accomplished each time that the implement is fully raised. If the lift assist wheel cylinders are connected to the tractor hydraulic system between the rockshaft cylinder and the control valving for the rockshaft cylinder, the pressure relief valve for the rockshaft cylinder also serves to protect the rockshaft cylinder against excessive pressures resulting from pressure jacking due to the reduced volume through the series cylinders.

If the integral implement is of the rigid type, the series connection between the lift assist wheel cylinders and the tractor rockshaft cylinder provides an increase in lift capacity of the tractor, makes possible the use of a single lever to simultaneously control both the tractor hitch and lift assist wheels, and makes the lift assist wheels responsive to variations in draft loads. If the integral implement is of the flexible type having a center frame and outrigger frames pivotally connected to the center frame for independent vertical movement, the center frame can be integrally attached to the tractor three-point hitch and the outrigger frames carried by the lift assist wheels. In the tractor and flexible integral implement arrangement, the series connection between the lift assist wheel cylinders and the tractor rockshaft cylinder provide an increase in lift capacity of the tractor, makes possible the use of a single lever to simultaneously control both the center and outrigger frames and makes possible the utilization of the load sensing of the three-point hitch while maintaining a uniform depth of penetration of all sections of the flexible integral implement irrespective of ground contour. In a tractor and flexible semi-integral implement arrangement, the lift assist wheels operate in the same manner and provide the same advantages as the lift assist wheel on a fully integral flexible implement with the one exception that the lift assist wheels also serve to aid the tractor hitch in lifting the center frame of the implement.

From the above summary of the invention, it can be seen that the object of the present invention is to provide a hydraulic lift system for tractor integral implement arrangements which increases the lift capacity for heavier and wider integral implements, permits the use of draft control with flexible implements by raising and lowering the sections of the implement in unison irrespective of terrain and provides a single lever control to simultaneously vertically adjust both the main and outrigger frames of the flexible implement.

The above object and advantages and a additional objects and advantages of the invention will become apparent to those skilled in the art from a reading of the following detailed description when taken in conjunction with accompanying drawings which illustrate preferred embodiments of the invention.

DESCRIPTION OF THE PREFERRED EMBODIMENT

The tractor illustrated in the drawings is for the most part of conventional construction and includes a main body 10 carried on front steerable wheels (undisclosed) and rear traction wheels 12. The rear portion of the tractor body carries a housing 14 which contains a tractor-mounted hydraulic motor indicated generally at 16. In its basic form, the hydraulic motor 16 includes a cylinder 18 in which a piston 20 travels to transmit force through a piston rod 22 to a tractor-mounted rockshaft 24. A suitable stop 26 is provided on the rod end of the rockshaft cylinder 18 to limit the outward travel of the piston 20. The rockshaft 24 extends beyond the sides of the housing and has lift arms 28 secured to its opposite ends. The free ends of the lift arms 28 are connected to a pair of lower draft links 30 by drop links 32.

The basic tractor also includes a source of fluid pressure such as a constant pressure variable displacement pump 34, a fluid reservoir 36 and a servocontrol valve indicated generally at 38. As is conventional, the control valve 38 is under the control of three initiating sources, a manual control, a draft-responsive control and a position-responsive control. The manual control takes the form of a rockable and selectively setable hand lever 40 which is mounted on the tractor in any suitable manner and connected to the control valve 38 by a suitable linkage represented by the dotted lines 42. The draft response control includes the tractor draft links 30 and suitable linkage represented by the dotted lines 44 which signals the draft loads imposed upon the links 30 to the control valve 38. The position-responsive control consists of suitable linkage represented by the dotted lines 46 and signals the relative angular position of the rockshaft 24 to the control valve 38. The construction and operation of the control valve 38 and its three initiating sources of control are all conventional and need not be elaborated. However, if necessary, a full understanding of the construction and operation of the same can be had by referring to U.S. Pat. No. 2,864,295 issued 16 Dec. 1958 to W. H. DuShane.

Figure 3:
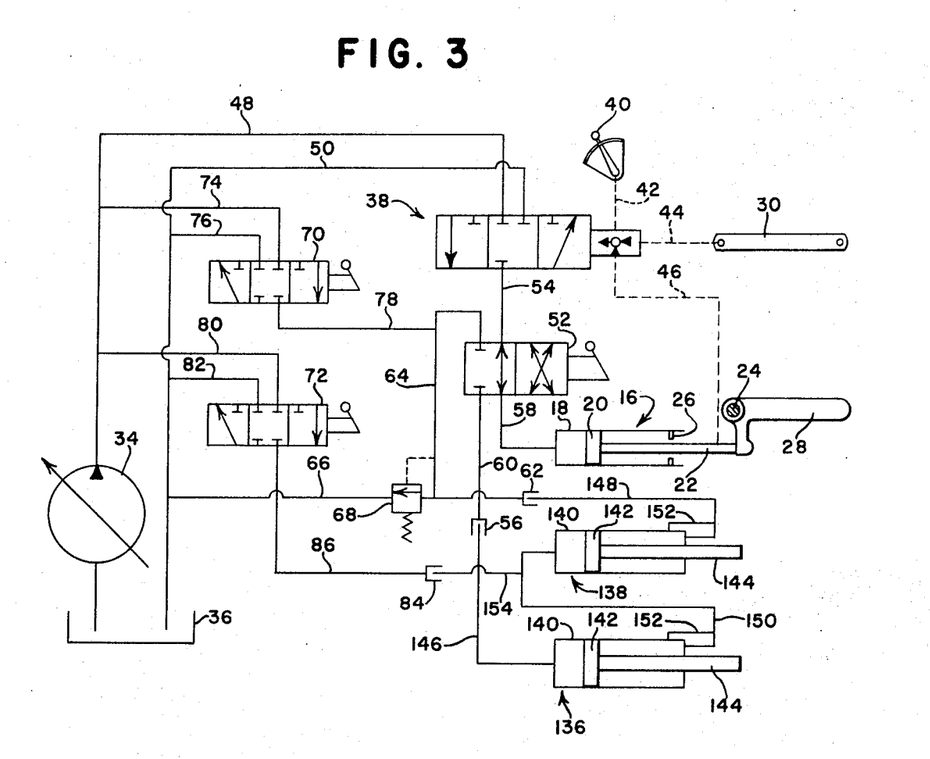
FIG. 3 is a schematic view of the hydraulic system embodied in the tractor and implement arrangement illustrated in FIG. 1.
Figure 6:
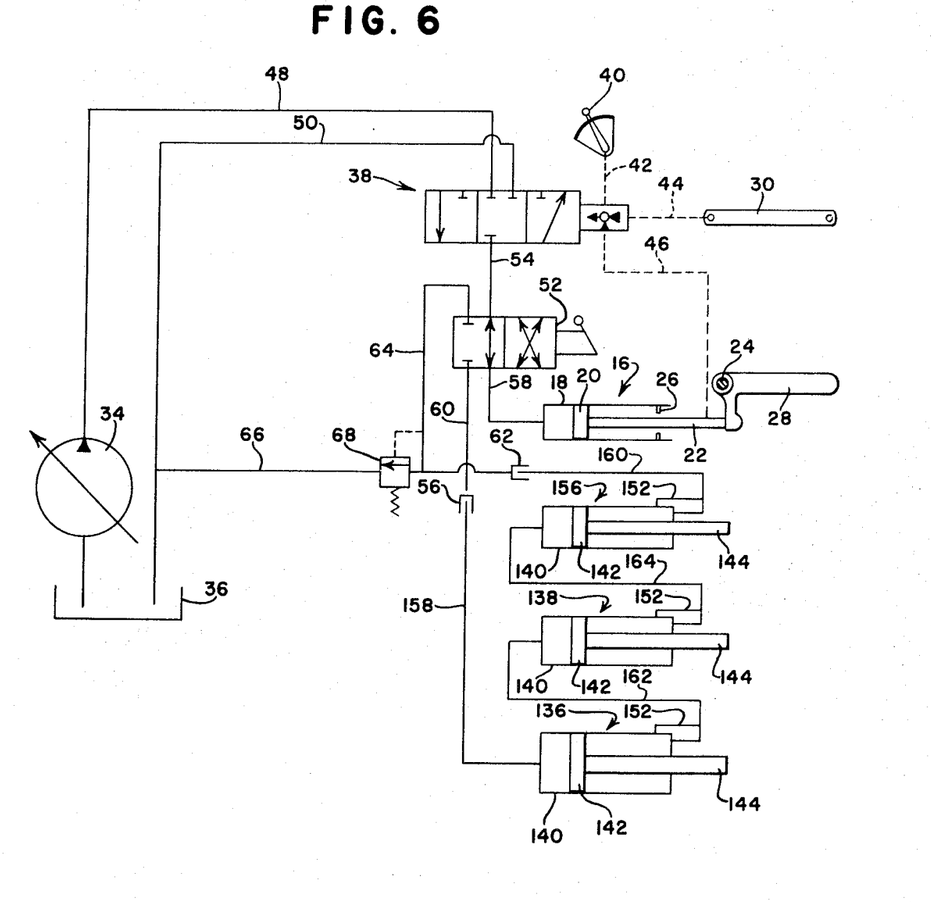
FIG. 6 is a schematic view of the hydraulic system embodied in the tractor and implement arrangement illustrated in FIG. 4.

As can be seen in FIGS. 3 and 6, one side of the control valve 38 is connected to the pump 34 and the reservoir 36 by fluid lines 48 and 50 respectively. At this point, the illustrated tractor differs from conventional tractors in that the other side of the control valve 38 is not connected directly to the anchor end of the rockshaft cylinder 18, but is connected to a first side of a manually operable selector valve 52 by a fluid line 54. The second side of the selector valve 52 is connected to the anchor end of the hydraulic cylinder 18 and to a remote cylinder outlet 56 by fluid lines 58 and 60 respectively. The first side of the selector valve 52 is also connected to a remote cylinder outlet 62 by fluid line 64 and to the sump 36 by a fluid line 66. A pressure relief valve 68 is interposed in the fluid line 66 and prevents the flow of fluid through the fluid line 66 until the pressure within line 64 exceeds a predetermined value. The pressure relief valve 68 is of the adjustable type so that the pressure required to open the valve may be varied for a purpose which will be explained hereinafter. The selector valve 52 is manually shiftable between a first position in which it connects the hydraulic motor 16 directly with the control valve 38 as illustrated in the drawings and a second position in which it connects the hydraulic motor 16 with the remote cylinder outlet 62 and the control valve 38 with the remote cylinder outlet 56.

Figure 4:
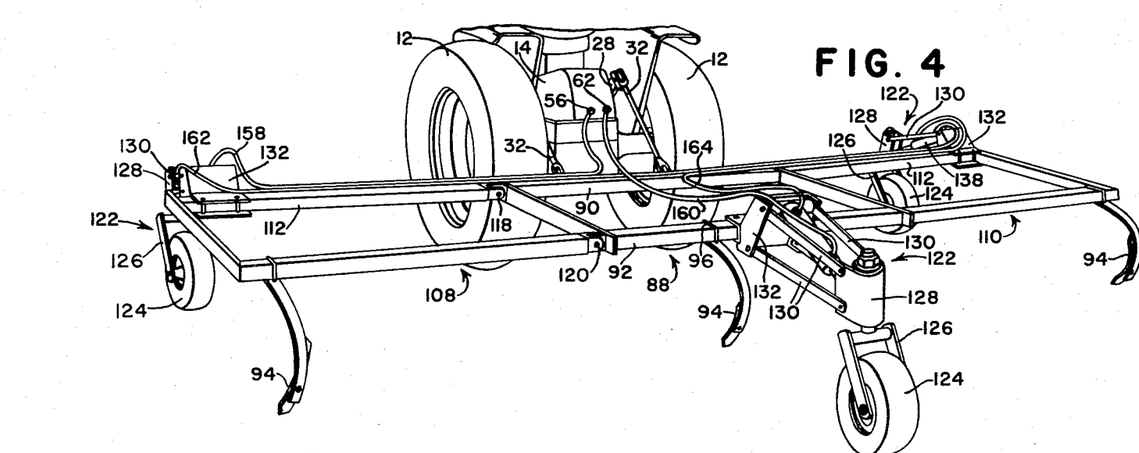
FIG 4 is a view similar to FIG. 1, but illustrating a modified form of the invention.
Figure 5:
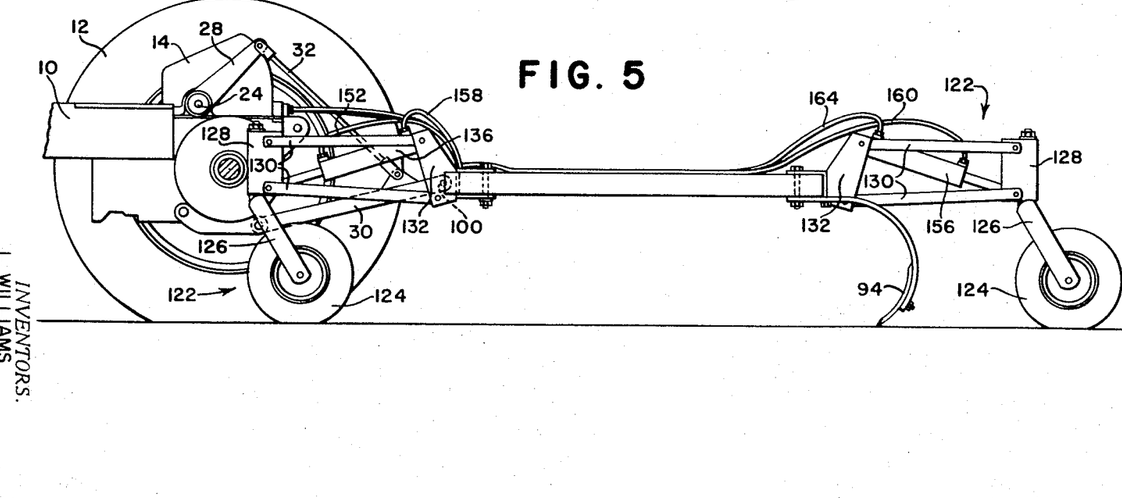
FIG. 5 is a side elevation view of the tractor and implement combination illustrated in FIG. 4, with the near wheel of the tractor removed to expose major portions of the tractor hitch.

As illustrated in FIG. 3, the tractor-forming part of the first embodiment of the invention (FIGS. 1 through 3) includes a pair of auxiliary control valves 70 and 72. One side of the control valve 70 is connected to the fluid lines 48 and 50 by additional fluid lines 74 and 76 respectively. A second side of the control valve 70 is connected to the fluid line 64 by an additional fluid line 78. The first side of the auxiliary valve 72 is connected to the fluid lines 48 and 50 by additional fluid lines 80 and 82 respectively, while the second side of the valve 72 is connected to a third remote cylinder outlet 84 by fluid line 86. The purpose of the auxiliary valves 70 and 72 will be made apparent in the description of operation. While only the tractor illustrated in the first embodiment of the invention (FIGS. 1 through 3) has been provided with auxiliary valves, after a reading of the full description of the details of construction and operation of the invention, those skilled in the art will understand that the function of the valves 70 and 72 would be equally desirable in the second embodiment of the invention (FIGS. 4–6).

Figure 1:
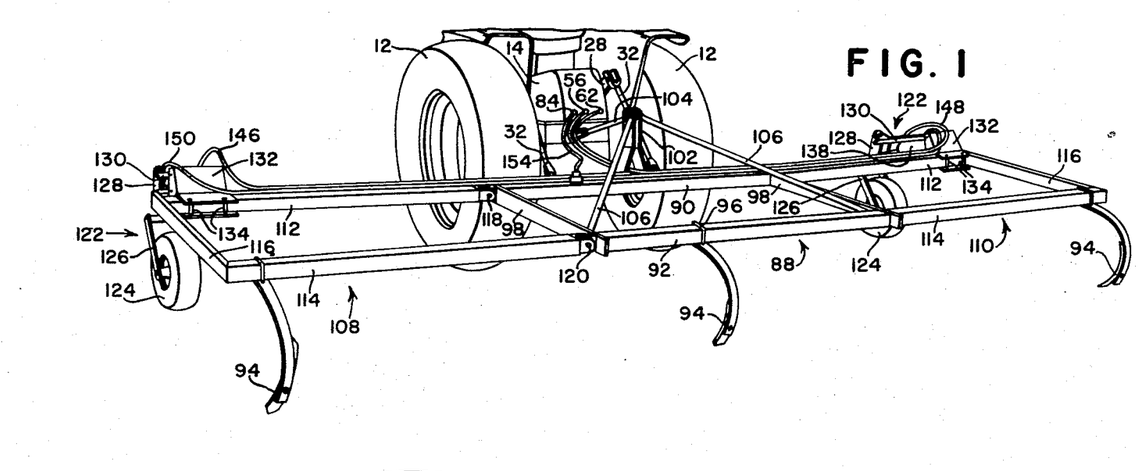
FIG. 1 is a perspective view of a tractor and implement combination embodying the principles of the present invention.
Figure 2:
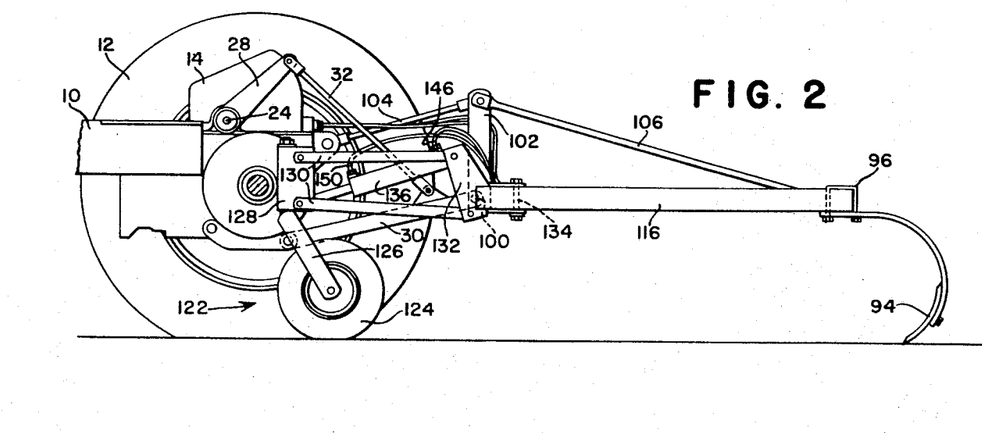
FIG. 2 is a side elevation view of the tractor and implement illustrated in FIG. 1, with the near wheel of the tractor removed to expose major portions of the tractor hitch.

Referring now to FIGS. 1 and 2, an exemplary implement, which may form part of the tractor implement arrangement according to the first embodiment of the invention, includes a center frame indicated generally at 88. The center frame includes forward and rear tool bars 90 and 92 to which various earthworking tools such as chisel plows 94 may be secured by U-bolts 96. Only one of the chisel plows is illustrated on each frame for simplification purposes. The tool bars 90 and 92 are connected at their ends by longitudinally extending side rails 98. The forward tool bar 90 carries a pair of spaced hitch pins 100 which extend through the conventional apertured balls carried by the trailing ends of the draft links 30. The forward tool bar 90 also carries an upstanding mast 102 whose upper end pivotally receives the trailing end of a compression link 104 which forms the third member of the tractor three-point hitch. A pair of braces 106 extend between the upper end of the mast 102 and the rear tool bar 92 to reinforce the mast 102. It can be seen from the above that the center frame 88 is completely carried by the tractor through the three-point hitch consisting of the draft links 30 and compression link 104, and that by extending or retracting the hydraulic motor 16 to rotate the rockshaft 24, the center frame 88 is raised and lowered.

A pair of outrigger frames are indicated generally at 108 and 110 and each includes front and rear tool bars 112 and 114 which carry earthworking tools 94 and which are interconnected at their outer ends by a longitudinally extending rail 116. The outrigger frames 108 and 110 are secured to opposite sides of the center frame 88 for vertical pivotal movement about longitudinally extending axes defined by front and rear pivot bolts 118 and 120 respectively. The outer end of outrigger frame is carried by a lift assist wheel package indicated generally at 122. Each lift assist wheel package includes a wheel 124 rotatably carried between the legs of a fork member 126 which extends generally downwardly from a generally vertically extending shaft. The vertical shaft is journaled in an elongated hub or sleeve member 128 which is pivotally connected to the forward ends of elongated generally longitudinally extending and vertically spaced arms 130. The rearward ends of the arm 130 are pivotally connected in space relationship to a bracket 132 which is clamped to the forward tool bar 112 by bolts 134. The elongated hub 128, arms 130, and the bracket 132 form a four-bar linkage which permits vertical adjustment of the wheel 124 with respect to the associated outrigger frame. The four-bar linkage positions the wheels 124 well in advance of the implement and in substantial transverse alignment with the rear wheels 12 of the tractor so that all three sections of the implement are supported from substantially transversely aligned points. This will maintain the three frame sections in substantially the same plane as the tractor and implement travel over undulating terrain.

The wheel unit for the left-hand outrigger frame as viewed in FIG. 1 is raised and lowered by a hydraulic motor 136 while the lift assist wheel unit for the right-hand outrigger frame is raised and lowered by a hydraulic motor 138. Each of the hydraulic motors 136 and 138 consist of a cylinder 140 in which a piston 142 is slidably mounted and has a piston rod 144 extending from one side thereof. The rods 144 on the hydraulic motor 136 and 138 are pivotally connected to the lower end of the associated hubs 128 and the anchor ends of the cylinders 140 are pivotally connected to the upper end of the associated brackets 132 so that by extending the piston rods 144 the outer ends of the outrigger frame are raised and by retracting the piston rods 144 the outer ends of the outrigger frame are lowered.

The hydraulic motors 136 and 138 which raise and lower the outer ends of the outrigger frames are connected to the hydraulic power lift system of the tractor and are also connected in series. To this end, the hydraulic motor 136 which is first in the series when raising the frames has its anchor end connected to the remote cylinder outlet 56 on a tractor by fluid line 146. Similarly, the hydraulic motor 138 which is last in the series has its rod end connected to the remote cylinder outlet 62 by a fluid line 148. The rod end of the hydraulic motor 136 is also connected to the anchor end of the motor 138 by a fluid line 150.

Each of the hydraulic motors 136 and 138 is provided with a bypass circuit 152 at its rod end which permits the flow of fluid through the cylinder when it has been fully extended. The purpose of the bypass circuits 152 will become apparent hereinafter.

Displacement of the implement-mounted cylinders is so matched that movement of a given piston rod will be accompanied by equal movement of the other piston rod. For example, the fluid displaced from the rod end of the hydraulic motor 136 for a given movement of the piston rod 144 associated therewith will equal the amount of fluid needed within the anchor end of the hydraulic motor 138 to move the piston rod 144 associated therewith an equal amount. The size of the hydraulic motors 136 and 138 are also selected so that the fluid displaced from the rod end of the hydraulic motor 138 during the total outward stroke of the associated piston rod 144 will substantially equal or be greater than the amount of fluid needed within the anchor end of the tractor-mounted hydraulic motor 16 to drive the piston rod 22 through its entire outward stroke.

For a reason which will be explained hereinafter, the fluid line 150 which connects the rod end of the hydraulic motor 136 with the anchor end of the hydraulic motor 138, it is also connected to the remote cylinder outlet 84 by an additional fluid line 154.

The operation of the above-described tractor and implement combination is as follows: With the center frame 88 of the implement connected to the tractor three-point hitch and the fluid lines 146, 148 and 154 connected to the remote cylinder outlets 56, 62 and 84 respectively, the selector valve 52 will be moved to the left to interconnect the hydraulic motor 16 with the remote cylinder outlet 62 and the control valve 38 with the remote cylinder outlet 56. The tractor operator then selects whether he wants the control valve 38 to be responsive to the draft loads imposed upon the implement, the relative angular position of the rockshaft 24, or a combination of the draft loads and the relative angular position of the rockshaft 24 in the manner described in the previously mentioned U.S. Pat. No. 2,864,295. In the following description of operation of the first embodiment of the invention, it will be assumed that the control valve 38 is responsive only to movements of the manual control lever 40 and the draft responsive control.

When it is desired to lower the implement frames to their working positions, the hand lever 40 is moved downwardly along its quadrant to move the control valve to the left to its exhaust position in which the fluid line 54 is connected to the sump 36. With the control valve 38 in its exhaust position, the weight of the outer end of the outrigger frame 108 will force the piston rod 144 of the hydraulic motor 136 inwardly and force fluid from the anchor end of the motor 136 through the fluid lines 146, 60, 54 and 50 to the sump 36. At the same time, the weight of the outer end of the outrigger frame 110 will push the piston rod of the hydraulic motor 138 inwardly to force fluid from the anchor end of the motor 138 through the fluid line 150 to the rod end of the motor 136. Simultaneously, the weight of the center frame 88 and the inner ends of the outrigger frames 108 and 110 acting through the drop links 32 and lift arms 28 will force the piston rod 22 of the tractor-mounted hydraulic motor 16 inwardly and force fluid from the anchor end of the hydraulic motor 16 through the fluid lines 58, 64 and 148 to the rod end of the hydraulic motor 138. As the implement frames are lowered, the earthworking tools 94 mounted thereon will move into the earth and their resistance to movement through the earth imposes draft loads on the implement frames. The draft loads imposed upon the implement frames are transmitted through the draft links 30 and linkage 44 to the control valve 38. As the draft loads increase due to movement of the tools 94 into the earth, the draft-responsive control begins to move the control valve 38 back to its neutral position. When the draft loads have reached the value selected by the position of the hand lever 40, the draft responsive control will have moved the control valve 38 to the neutral position indicated FIG. 3. When the control valve 38 is in the neutral position, the implement frames are locked within their vertically adjusted positions until the hand lever 40 is moved or until some change occurs in the draft load due to changes the soil condition or the like.

As the tractor and implement progress over the field being worked, should an area of high-density soil be encountered, the draft loads imposed on the implement will increase, and the increased draft load will be signaled to the control valve 38 through the draft links 30 and the linkage 44. The control valve 38 will then be moved to the right toward its supply position where the fluid line 54 will be connected to the pump 34. The pump 34 will supply fluid pressure to the anchor end of the hydraulic motor 136 to extend its piston rod 144 and raise the outer end of the outrigger frame 108. As the piston roof the hydraulic motor 136 is extended, fluid will be forced from the rod end of the motor 136 to the anchor end of the motor 138 to extend its piston rod 144 and raise the outer end of the outrigger frame 110 simultaneously with the raising of the outer end of the outrigger frame 108. Simultaneously, fluid will be displaced from the rod end of the hydraulic motor 138 into the anchor end of the tractor-mounted hydraulic motor 16 to extend its rod 22 and raise the center frame 88 and inner ends of the outrigger frames 108 and 110. When the implement frames have been raised a sufficient distance to decrease the draft load back to that value selected by the position of the hand lever 40, the draft-responsive control will move the control valve 38 back to its neutral position. If the draft load imposed upon the implement drops below the value selected by the position of the hand lever 40, the draft-responsive control will move the control valve 38 to lower the implement frame until the selected draft load is again achieved.

To fully raise the implement frames so that the tools mounted thereon are removed from the ground, it is only necessary to move the hand lever 40 to the top of its associated quadrant so that the control valve 38 is moved to its supply position. When the hand lever 40 is moved to the top of its quadrant, the draft-responsive control will be inoperative to return the control valve 38 to its neutral position and fluid pressure at the rated pressure of the constant pressure pump 34 will be continuously supplied to the hydraulic motors. During the outward movement of the piston rods during lifting of the implement frames, should any one of the piston rods reach the end of its stroke before the other piston rods reach the outer ends of their strokes, fluid will bypass the associated piston to allow the other piston rods to reach the ends of their strokes. For example, should the piston rod 144 of the hydraulic motor 136 bottom out on the rod end of the motor before the piston rods within hydraulic motors 138 and 16 bottom out, continued fluid movement is provided through the bypass 152. Similarly, should the piston 20 of the hydraulic motor 16 bottom out against the stop 26 before the pistons 142 within the hydraulic motors 138 and 136 bottom out, fluid pressure within the fluid line 64 will open the bypass valve 68 and provide for continued fluid movement through the fluid line 66 to the sump 36. Thus, each time the implement frames are fully raised, the hydraulic motors 16, 136 and 138 will be automatically synchronized to compensate for any fluid leakage which may have occurred.

It should be noted that the cylinders are so connected with the pump 34 when raising the implement frames that fluid will first flow through the largest and then the sequentially smaller hydraulic motors. By employing this arrangement maximum lift capacity of the system is achieved since the maximum lift is determined by the effective cross-sectional area on the anchor end of the largest hydraulic motor. In this respect, it should also be noted that the pressure relief valve 68 which provides for synchronization of the hydraulic motor 16 with the remote hydraulic motors 136 and 138 also protects the hydraulic motor 16 from damage due to excessively high pressure which may result from pressure jacking through the remote hydraulic motors. Pressure jacking is the result of increased pressure through the series of motors due to the reduced volume through the series.

In the first embodiment of the invention illustrated in FIGS. 1–3, it is possible to vary the vertical adjustment of the center frame 88 with respect to the outer ends of the outrigger frames 108 and 110 or to vary the vertical adjustment of the outer end of either one or both of the outrigger frames with respect to the remainder of the implement. This is accomplished by the auxiliary control valves 70 and 72 and is often a desirable function when working on uneven terrain. To raise the center frame 88 with respect to the outer end of the outrigger frames 108 and 110, it is only necessary to move the control valve 70 to the left to its supply position to connect the fluid line 64 with the main supply line 48 by way of the fluid lines 74 and 78. With the control valve 70 in a supply position, fluid will be supplied to the anchor end of the tractor-mounted hydraulic motor 16 and the piston rod 22 will be extended to rotate the rockshaft 24 and raise the center frame 88. The outer ends of the outer frames will be unaffected since fluid in the anchor end of the hydraulic motor 136 is trapped by the control valve 38. To lower the center frame 88 with respect to the outer end of the outrigger frames 108 and 110, it is only necessary to move the control valve 70 to the right to its exhaust position in which it connects the fluid line 64 with the main exhaust line 50 by way of the fluid lines 76 and 78. When fluid is being exhausted from the anchor end of the hydraulic motor 16, the vertical adjustment of the outer ends of the outrigger frames will not be affected since the weight of the as outrigger frames holds the piston rods 144 of the hydraulic motors 136 and 138 in their retracted position.

The vertical adjustment of the outer end of the outrigger frame 108 can be varied with respect to the remainder of the implement by moving the auxiliary control valve 72 to its supply or exhaust position. When the valve 72 is in a hand the trigger position, fluid is routed to the anchor end of the hydraulic motor 138 to raise the center frame 88 and outrigger frame 110 with respect to the outer end of the outrigger frame 108. When the control valve 72 is in its exhaust position, fluid is exhausted from the anchor end of the hydraulic motor 138 to lower the center frame 88 and outrigger frame 110 with respect to the outrigger frame 108. With the various frames in their adjusted vertical position, the entire implement can then be brought back to the desired working depth by manipulation of the and lever 40.

To raise the outer end of the outrigger frame 110 with respect to the remainder of the implement, the control valve 72 is first moved to its supply position to raise the center frame 88 and outrigger frame 110, and then the control valve 70 is moved to its exhaust position to lower the center frame with respect to the outrigger frames. To lower the outer end of the outrigger frame 110, the control valve 72 is moved to its exhaust position to lower both the center frame 88 and outrigger frame 110, and then the control valve 70 is moved to its supply position to return the center frame 88 to its original position. It should be noted that the various frames will remain in their adjusted vertical position until such time as the implement is fully raised and the hydraulic motors are resynchronized by the bypass circuits 152 and the pressure relief valve 68.

As previously mentioned, the above description of operation was on the assumption that the control valve 38 was not influenced in any manner by the position-responsive control. However, it is also possible to adjust the control linkage so that the control valve 38 is solely responsive to the position of the rockshaft 24. With the control linkage so adjusted, the implement frames will be raised and lowered in unison and in equal amounts to a height indicated by the setting of the control lever 40. It is also possible to adjust the control linkage so that the control valve 38 is responsive to a combination of the draft loads and the relative angular position of the rockshaft 24. In the latter case, the control valve 38 is less responsive to the variations in the draft loads than when the control linkage is adjusted to be responsive solely to the variations in draft loads.

Referring now to the second embodiment of the invention illustrated in FIGS. 4-6, the implement forming part of the combination according to the second embodiment of the invention is in many respects similar to the implement forming part of the combination according to the first embodiment of the invention and differs only in that it is only semi-integrally mounted to the tractor. The implement according to the second embodiment of the invention includes a center frame 88 and outrigger frames 108 and 110 which carry earthworking tools 94. The forward tool bar 90 of the center frame 88 carries a pair of transversely extending spaced hitch pins 100 which extend through the conventional apertured balls carried by the trailing end of the draft links 30. The inner ends of the outrigger frames 108 and 110 are secured to the opposite sides of the center frame 88 for vertical pivotal movement about longitudinally extending axes defined by front and rear pivot bolts 118 and 120, and the outer end of each outrigger frame and the rear portion of the center frame are carried by lift assist wheel units indicated generally at 122. Each lift assist wheel unit includes a wheel 124 carried between the legs of a fork 126 which is secured to and extends downwardly from a generally vertically extending shaft rotatably journaled in an elongated hub or sleeve member 128. Each hub 128 is pivotally connected to the ends of elongated generally fore-and-aft extending and vertically spaced arms 130 which have their opposite ends pivotally connected in spaced relationship to brackets 132. The brackets 132 for the outrigger frames 108 and 110 are clamped to the forward tool bars 112 of the outrigger frames and the arms 130 extend forwardly therefrom, while the bracket 132 of the lift assist wheel unit for the rear of the center frame 88 is attached to the rear tool bar 92 of the center frame 88 and the arms 130 extend rearwardly therefrom.

The vertical adjustment of the lift assist wheel unit of the outrigger frame 108 is controlled by a double-acting hydraulic motor 136, the vertical adjustment for the lift assist wheel unit for the outrigger frame 110 is controlled by a double-acting hydraulic motor 138, and the vertical adjustment of the lift assist wheel unit for the rear of the center frame 88 is controlled by a double-acting hydraulic motor 156. Each of the hydraulic motors 136, 138 and 156 are connected in series with each other and in series with the tractor hydraulic lift system between the control valve 38 and the tractor-mounted hydraulic motor 16. To this end, the anchor end of the hydraulic motor 136 is connected to the remote cylinder outlet 56 by a fluid line 158 and the rod end of the hydraulic motor 156 is connected to the remote cylinder outlet 62 by a fluid line 160. Also, the anchor end of the hydraulic motor 138 is connected to the rod end of the hydraulic motor 136 by a fluid line 162 and the rod end of the hydraulic motor 138 is connected to the anchor end of the hydraulic motor 156 by a fluid line 164. Each of the hydraulic motors 136, 138 and 156 is also provided with a bypass circuit 152 which provides for the free flow of fluid through the motor when the associated piston rod is fully extended.

The second embodiment of the invention illustrated in FIGS. 4-6 operates in the same manner as the first embodiment of the invention illustrated in FIGS. 1-3 with the one exception that the center frame 88 is raised through the joint effort of the tractor-mounted hydraulic motor 16 and the remote hydraulic motor 156. Specifically, when the control valve 38 is moved to the supply position, whether by operation of the control lever 40 or due to an increase in draft load, fluid under pressure is supplied to the anchor end of the hydraulic motor 136 to extend its associated piston rod 144 and raise the outer end of the outrigger frame 108. Simultaneously, fluid is forced from the rod end of the hydraulic motor 136 to the anchor end of the hydraulic motor 138 to extend its associated piston rod 144 and raise the outer end of the outrigger frame 110. Simultaneously, with the raising of the outer ends of the outrigger frames, fluid is forced from the rod end of the hydraulic motor 138 to the anchor end of the hydraulic motor 156 to extend its associated piston rod 144 to raise the rear portion of the center frame 88. Also, simultaneously with the raising of the rear portion of the center frame 88, the forward portion of the center frame is also raised by fluid displaced from the rod end of the hydraulic motor 156 to the anchor end of the tractor-mounted hydraulic motor 16.

As in the first embodiment of the invention, all of the hydraulic motors utilized in the second embodiment of the invention will automatically be synchronized when the implement is fully raised due to the bypass circuits 152 and the pressure relief valve 68. Also, the pressure relief valve 68 will protect the tractor-mounted hydraulic motor 16 from excessive pressure due to pressure jacking.

It should be noted that with the above-described embodiments of the invention pressure jacking will occur only under special circumstances, but under normal conditions a great amount of power is expended in raising the frames and the fluid pressure that reaches the motor 16 will be well below the rated pressure of the pump 34. Therefore, in order to operate under normal conditions, it is essential that the setting of the pressure relief valve 68 be low enough to open at a pressure slightly less than the pressure available to the motor 16, but at the same time must be high enough to insure that the motor 16 is extended to raise the center frame. Furthermore, the pressure available to the motor 16 varies with implements of different sizes and types so that valve 68 must be adjusted to different settings for different implements.

The necessity to vary the setting of the pressure relief valve 68 for different implements can be overcome by providing the hydraulic motor 16 with a positive bypass such as a bypass circuit similar to the bypass circuits 152 for the implement mounted cylinders or a poppet valve, either of which would return fluid directly to the reservoir when the motor 16 is fully extended. With such a positive bypass the pressure relief valve 68 would be required only to protect the motor 16 from excessive pressure and could be permanently set at approximately the maximum system pressure.

From the above descriptions of construction and operation, it can be seen that the present invention provides a hydraulic power lift system for tractor and integral implement combinations which increases the lift capacity of the tractor, provides a single lever control for all the frames of a flexible integral implement, and makes possible the use of draft control with flexible integral implements.

While preferred embodiments of the invention have been illustrated and described, it will be apparent to those skilled in the art that variations and modifications thereof can be made without departing from the underlying principles of the invention.

We claim:

1. A tractor and implement arrangement in which the tractor includes pivotally mounted trailing draft links, tractor-mounted hydraulic motor means for raising and lowering the draft links, a source of fluid pressure for the motor means, and a control valve for controlling the flow of fluid from the source to the motor means, and the implement comprises a transversely elongated frame formed from a plurality of frame sections pivotally connected at adjoining ends for independent vertical movement, means connecting one of the frame sections to the trailing ends of the tractor draft links to be raised and lowered thereby, a plurality of lift assist wheels adjustably mounted on the frame with at least one lift assist wheel being mounted on each frame section not connected to the tractor draft links, a plurality of hydraulic motors mounted on the frame and operatively connected to the wheels to raise and lower the frame relative to the wheels, and fluid line means connecting the control valve, implement-mounted motors and tractor-mounted motor means in series so that the frame section connected to the draft links is movable vertically in unison with and in substantially equal amounts as the frame sections not connected to the draft links.

2. The tractor and implement arrangement set forth in claim 1 wherein the tractor-mounted motor means and implement-mounted motors are extensible and retractable cylinders having anchor and rod ends with the anchor end of each cylinder having an effective cross-sectional area greater than the effective cross-sectional area of the rod end of the cylinder, the fluid line means interconnects the rod end of each implement-mounted cylinder with the anchor end of another cylinder, the anchor end of the first cylinder in series when raising the implement with the control valve and the rod end of the last implement-mounted cylinder in series when raising the implement with the tractor-mounted cylinder.

3. The tractor and implement arrangement set forth in claim 2 wherein the rod end of each implement-mounted cylinder has an effective cross-sectional area substantially equal to the effective cross-sectional area of the anchor end of the implement-mounted cylinder to which it is connected by the fluid line means.

4. The tractor and implement arrangement set forth in claim 3 wherein each of the implement-mounted cylinders is provided with bypass circuit means which allows free flow of fluid through the cylinder when the cylinder has been moved to its limit in one direction, and wherein a pressure relief valve is provided in the fluid line means between the tractor-mounted cylinder and the last cylinder in the series of implement-mounted cylinders.

5. The tractor and implement arrangement set forth in claim 3 wherein each of the cylinders is provided with a bypass circuit means which affords free flow of fluid through the cylinder when it has been moved to its limit in one direction.

6. The tractor and implement arrangement set forth in claim 5 further including a pressure relief valve provided in the further fluid line means between the tractor-mounted cylinder and the last cylinder in the series of implement-mounted cylinders.

7. The tractor and implement arrangement set forth in claim 1 wherein an additional fluid line means interconnects the source of fluid pressure and the fluid line means between the tractor-mounted motor means and the last motor in the series of implement-mounted motors, and wherein a manual directional flow control valve is provided in the additional fluid line means.

8. The tractor and implement arrangement set forth in claim 1 wherein the forward portion of the one frame section is pivotally connected to and supported by the tractor draft links and the rearward portion of the one frame section is supported by one of the plurality of lift assist wheels.

9. A tractor and implement arrangement in which the tractor has draft links pivotally mounted to the rear of the tractor in trailing relationship, tractor-mounted hydraulic motor means for raising and lowering the draft links, a source of fluid pressure, a control valve for controlling the flow of fluid from the source, a pair of remote hydraulic motor outlets, and a selector valve movable between a first position in which it interconnects the control valve and hydraulic motor means and a second position in which it interconnects the control valve with one remote motor outlet and the motor means with the other remote motor outlet, and the implement comprises a transversely elongated frame having a center section mounted medially its ends to the trailing ends of the draft links, a pair of outrigger sections pivotally connected to the sides of the center section for independent vertical movement about generally horizontal axes, a plurality of lift assist wheels, means connecting the lift assist wheels to the frame for vertical movement relative thereto, there being at least one lift assist wheel connected to each outrigger section, a plurality of hydraulic motors mounted on the frame and operatively connected to the lift assist wheels to raise and lower the frame relative to the wheels, fluid line means connecting the plurality of hydraulic motors in series, and further fluid line means connecting the hydraulic motors with the remote motor outlets on the tractor.

10. The tractor and implement arrangement set forth in claim 9 wherein each of the frame-mounted hydraulic motors is a double-acting extensible and retractable hydraulic cylinder having a rod end and an anchor end, and the tractor-mounted hydraulic motor means includes an extensible and retractable hydraulic cylinder having a rod end and an anchor end.

11. The tractor and implement arrangement set forth in claim 10 wherein the further fluid line means connects the anchor end of the first frame-mounted cylinder in series when raising the frames with the one remote motor outlet and the rod end of the last frame-mounted cylinder in series when raising the frames with the other remote motor outlet, and wherein the first-mentioned fluid line means connects the rod end of each cylinder in series with the anchor end of the next adjacent cylinder in series.

12. The tractor and implement arrangement set forth in claim 11 wherein the rod end of each frame-mounted cylinder has a displacement substantially equal to the displacement of the anchor end of the cylinder to which it is connected by the first-mentioned fluid line means.

13. The tractor and implement arrangement set forth in claim 12 wherein each of the cylinders is provided with a bypass circuit means which affords free flow of fluid through the cylinder when it has been moved to its limit in one direction.

14. The tractor and implement arrangement set forth in claim 13 wherein a pressure relief valve is provided between the other remote motor outlet and the tractor-mounted cylinder.

15. The tractor and implement arrangement set forth in claim 10 wherein each frame-mounted cylinder is provided with a fluid bypass circuit means which affords the free flow of fluid through the cylinder when the cylinder is fully extended, and wherein a pressure relief valve is provided between the other remote motor outlet and the tractor-mounted cylinder.

16. The tractor and implement arrangement set forth in claim 9 wherein means are provided to selectively supply and exhaust fluid to the fluid line means between each pair of adjacent motors.

17. The tractor and implement arrangement set forth in claim 9 wherein means are provided to selectively supply and exhaust fluid between the tractor-mounted motor means and the frame-mounted motor which is last in the series when raising.

18. The tractor and implement arrangement set forth in claim 9 wherein the means mounting the lift assist wheels on the outrigger sections extend forwardly of the frame to position the lift assist wheels mounted on the outrigger sections in advance of the frame.

19. The combination of a tractor having a pair of pivotally mounted trailing draft links, an upper pivotally mounted trailing compression link, hydraulic cylinder means operatively connected to and for raising and lowering the draft links, a source of fluid pressure and a control valve for controlling the flow of fluid pressure from the source, and means carried by the tractor and responsive to the draft forces imposed upon the tractor to move the control valve from a neutral position upon variation from a selected draft force, and a tillage implement having a flexible frame including a center frame section carried by the draft and compression links, a pair of outrigger frame sections pivotally connected to the center frame section for independent vertical movement about generally longitudinally extending axes; a pair of lift assist wheels, means mounting the lift assist wheels on the outrigger frame sections for vertical movement relative thereto; a pair of extensible and retractable hydraulic cylinders mounted on the outrigger frame sections and operatively connected to the lift assist wheels to raise and lower the outrigger frame sections relative to the wheels, and means connecting the control valve, the frame-mounted hydraulic cylinders and the tractor hydraulic cylinder means in series so that each of said frame sections is raised and lowered in unison with the other frame sections in accordance with the total draft load on the draft links.

20. The combination set forth in claim 19 wherein the frame-mounted cylinders are connected to the tractor hydraulic power lift system in series between the control valve and tractor-mounted hydraulic cylinder means, and a pressure relief valve is provided between the tractor-mounted hydraulic cylinder means and the last in the series of implement-mounted hydraulic cylinders.

21. The combination set forth in claim 19 wherein the means mounting the lift assist wheels on the outrigger frame sections includes link means extending forwardly of the sections to position the lift assist wheels in substantially transverse alignment with the rear wheels of the tractor.

22. A tractor and implement arrangement in which the tractor includes a pair of pivotally mounted trailing draft links and a pivotally mounted trailing compression link forming a three-point hitch, a tractor-mounted hydraulic motor means for raising and lowering the trailing ends of the draft links, a source of fluid pressure for the motor means, and a control valve for controlling the flow of fluid from the source to the motor means, and the implement comprises an elongated frame extending transversely of the tractor with its ends extending beyond the sides of the tractor, means integrally connecting the frame medially its ends to the trailing ends of the draft and compression links, a plurality of lift assist wheels adjustably connected to the frame with a pair thereof mounted adjacent the ends of the frame, a plurality of hydraulic motors mounted on the frame and operatively connected to the wheels to raise and lower the frame on the wheels, and fluid line means connecting the control valve, implement-mounted motors and tractor-mounted motor means in series so that the wheels will vertically adjust the respective ends of the frame in unison with the three-point hitch vertically adjusting the medial position of the frame.

23. The tractor and implement arrangement set forth in claim 22 wherein the implement frame includes a plurality of frame sections pivotally connected at adjoining ends for independent vertical movement, wherein one of the sections is connected to and carried by the tractor draft links, and wherein the remaining sections are supported by the vertically adjustable lift assist wheels.

24. The tractor and implement arrangement set forth in claim 22 wherein the implement frame includes a center frame section connected to and supported solely by the draft links and a pair of outrigger frame sections pivotally connected to the center frame section for independent vertical movement, and wherein each of the outrigger frame sections is supported by one of the plurality of lift assist wheels.

25. The tractor and implement arrangement set forth in claim 24 wherein the lift assist wheels supporting the outrigger frame sections are connected to the outrigger frame sections by four-bar linkages which extend forwardly of the frame.

* * * * *